(12) United States Patent
Ginsberg et al.

(10) Patent No.: US 9,203,744 B2
(45) Date of Patent: Dec. 1, 2015

(54) CONVERGENCE OF MULTI-DESTINATION TRAFFIC IN A NETWORK ENVIRONMENT

(71) Applicant: CISCO TECHNOLOGY, INC., San Jose, CA (US)

(72) Inventors: Lester C. Ginsberg, Mount Herman, CA (US); Varun Shah, Milpitas, CA (US); Lakshmi Priya Sarma, Santa Clara, CA (US); Ramkumar Parameswaran, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 156 days.

(21) Appl. No.: 14/038,525

(22) Filed: Sep. 26, 2013

(65) Prior Publication Data

US 2015/0085706 A1 Mar. 26, 2015

(51) Int. Cl.
*H04J 1/16* (2006.01)
*H04L 12/753* (2013.01)
*H04L 12/761* (2013.01)

(52) U.S. Cl.
CPC ............. *H04L 45/48* (2013.01); *H04L 45/16* (2013.01)

(58) Field of Classification Search
CPC ......... H04L 12/44; H04L 45/02; H04L 45/16; H04L 45/48

USPC .......................................... 370/256
See application file for complete search history.

(56) References Cited

U.S. PATENT DOCUMENTS

| | | | | |
|---|---|---|---|---|
| 2008/0228940 A1* | 9/2008 | Thubert | .................. | 709/238 |
| 2011/0299527 A1* | 12/2011 | Yu et al. | .................. | 370/390 |
| 2015/0055652 A1* | 2/2015 | Yong et al. | .................. | 370/390 |

OTHER PUBLICATIONS

Cisco Systems, Inc., "Cisco FabricPath for Cisco Nexus 7000 Series Switches," © 2011, 44 pages; http://www.cisco.com/en/US/prod/collateral/switches/ps9441/ps9402/white_paper_c11-687554.pdf.

* cited by examiner

*Primary Examiner* — Kan Yuen
(74) *Attorney, Agent, or Firm* — Patent Capital Group

(57) ABSTRACT

An example method for convergence of multi-destination traffic in a network environment is provided and includes receiving a first type-length-value (TLV) message from a true broadcast root in a Transparent Interconnection of Lots of Links (TRILL) network, where the first TLV message indicates a first subset of multi-destination trees in the TRILL network, receiving a second TLV message from the true broadcast root indicating a second subset of multi-destination trees in the TRILL network, such that a union of the first subset and the second subset indicates at least one inactive multi-destination tree in the TRILL network, and deleting the inactive tree from a hash table of active trees.

17 Claims, 5 Drawing Sheets

CONVERGENCE OF MULTI-DESTINATION TRAFFIC IN A NETWORK ENVIRONMENT

TECHNICAL FIELD

This disclosure relates in general to the field of communications and, more particularly, to convergence of multi-destination traffic in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for convergence of multi-destination traffic in a network environment is provided and includes receiving a first type-length-value (TLV) message (e.g., from a true broadcast root) in a Transparent Interconnection of Lots of Links (TRILL) network, where the first TLV message indicates a first subset of multi-destination trees in the TRILL network, receiving a second TLV message (e.g., from the true broadcast root) indicating a second subset of multi-destination trees in the TRILL network, where a union of the first subset and the second subset indicates at least one inactive multi-destination tree in the TRILL network, and deleting the inactive tree from a hash table of active trees. As used herein, a "TLV message" includes a message in any suitable protocol (e.g., Intermediate System to Intermediate System (IS-IS)) indicating a type field (e.g., representing a kind of message portion), and a length field indicating the length (e.g., in bits) of a value field, which includes data carried by the message.

Example Embodiments

Figure 1:
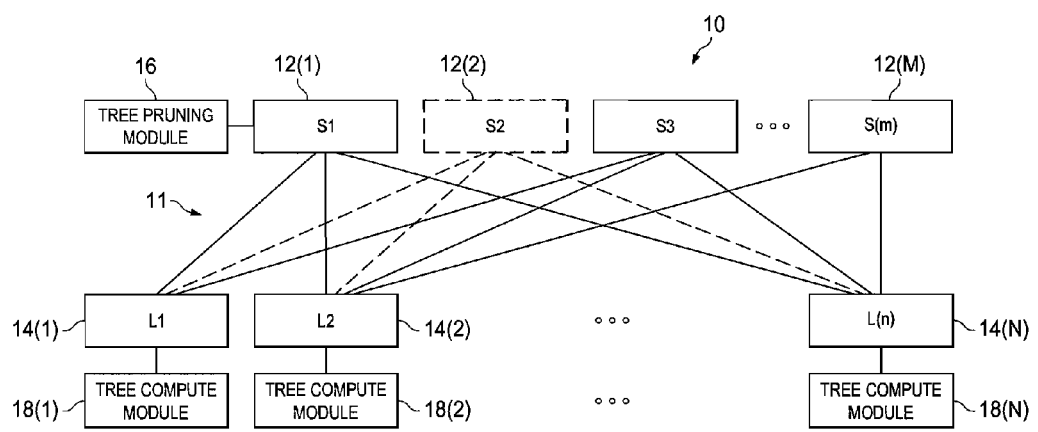
FIG. 1 is a simplified block diagram illustrating a communication system to facilitate convergence of multi-destination traffic in a network environment according to an example embodiment.

Turning to FIG. 1, FIG. 1 is a simplified block diagram illustrating an embodiment of communication system 10 for facilitating convergence of multi-destination traffic in a network environment. Communication system 10 includes a network 11, comprising a plurality of spine switches 12(1)-12(M) in communication with a plurality of leaf switches 14(1)-14(N). In various embodiments, network 11 may comprise a Transparent Interconnect Transparent Interconnection of Lots of Links (TRILL) network, or a variation or derivation thereof (e.g., Cisco® FabricPath™, Juniper® QFabric™). TRILL networks may include topologies comprising RBridges that are consistent with an Internet Engineering Task Force (IETF) standard as specified, for example, in Request For Comments (RFC) 6325 and associated standards.

As used herein, the term "leaf switch" refers to a network element capable of forwarding communication traffic (e.g., data packets) from and to servers and other such data origination or data termination devices. The term "spine switch" refers to a network element capable of forwarding communication traffic between leaf switches. As used herein, the term "network element" is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Spine switch 12(1) may include a tree pruning module 16, and each leaf switch 14(1)-14(N) may include respective tree compute modules 18(1)-18(N). According to various embodiments, tree pruning module 16 and tree compute modules 18(1)-18(N) may offer smooth convergence for multi-destination traffic across churn in supported multicast trees, for example, by trading off a number of trees against network churn events, allowing route computation to be temporally deferred until a critical threshold is hit.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

TRILL switches use one or more multi-destination trees to forward multi-destination frames including broadcast, multicast, and unknown unicast. The TRILL protocol automatically creates and uses discrete multi-destination trees touching substantially all switches in the domain for forwarding multi-destination traffic. RBridges in the TRILL network run a link state routing protocol, which gives each of them knowledge of the topology consisting of all the RBridges and all the links between RBridges in the TRILL network. Using the link state routing protocol, each RBridge calculates shortest paths from itself to each other RBridge, as well as trees for delivering multi-destination traffic.

The link state protocol is a routing protocol in which each router determines who its neighbors are, and broadcasts (to the other routers) a packet, known as a Link State Packet (LSP), that can include information such as router identity, router neighbors, link costs to respective neighbors, etc. Examples of link state protocols include Intermediate System-to-Intermediate System (IS-IS) and Open Shortest Path First (OSPF). IS-IS can route IP traffic and is used by many Internet Service Providers (ISPs) to route IP traffic. Each router saves a copy of the LSP information in a LSP database. The LSP database gives all the information necessary to compute paths. It also gives enough information for all the routers to calculate the same tree, without needing a separate spanning-tree algorithm.

Typically, each RBridge advertises in its LSP a "tree root" priority for its nickname (or for each of its nicknames if it has been configured to have more than one nickname). The tree root priority is a 16-bit unsigned integer that defaults, for an unconfigured RBridge, to 0x8000. Tree roots are generally ordered with highest numerical value being highest priority, then with system ID of the RBridge (numerically higher=higher priority) as tiebreaker, and if that is equal, by the numerically higher nickname value, as an unsigned integer, having priority.

Typical, the RBridge with a highest priority to be a tree root announces to the other RBridges (through its LSP) how many trees, and which trees, should be calculated. The RBridge with the highest priority in the TRILL network may be referred to herein as a "true broadcast root." Each tree is calculated as a tree of shortest paths from a given root, with a deterministic tie-breaker so that all RBridges calculate the same tree. The true broadcast root may also specify the ordered list of tree root nicknames for the other RBridges to compute in a Tree Identifiers (TREE-RT-IDs) type-length-value (TLV), for example, as specified in Request For Comments (RFC) 6326 and associated standards. Every RBridge specifies the trees it wants to use in a Trees Used Identifiers (TREE-USE-IDs) sub-TLV and the VLAN it is interested in an Interested VLANs and Spanning Tree Roots (INT-VLAN) sub-TLV.

The TREE-RT-IDs sub-TLV is an ordered list of RBridge nicknames. When originated by the RBridge that has the highest priority tree root, it lists the distribution trees that the other RBridges are required to compute as specified in Section 4.5 of RFC 6325. The starting tree number is used to allow the ordered lists to be correctly concatenated. According to current standards, in the event a tree identifier can be computed from two such sub-TLVs and they are different, then it is assumed that this is a transient condition that will be cleared, and during the transient time, such a tree is not computed.

In general, computing numerous multi-destination trees typically leads to a time synchronized churn in route computation and download across nodes in the TRILL network, for example, each time a LSP with change notification is flooded in the network. Typically, the LSP informing of change affecting several multi-destination trees causes multiple trees to be recomputed and downloaded at nodes across the network, which leads to loss of unicast flood, address resolution protocol (ARP) packets and other multi-destination frames for several seconds. In turn, this can lead to flaps across adjacencies for higher level protocols with significant black-holing of end-to-end traffic.

Communication system 10 is configured to address these issues (and others) in offering a system and method for convergence of multi-destination traffic in a network environment. In various embodiments, each tree compute module 18(1)-18(N) may receive a first TLV message (e.g., a first TREE-RT-IDs TLV) from the true broadcast root (e.g., spine switch 12(1)). The first TLV message can indicate a first subset ($S_1$) of multi-destination trees in TRILL network 11. Each tree compute module 18(1)-18(N) may receive a second TLV (e.g., a second TREE-RT-IDs TLV) message from the true broadcast root indicating a second subset ($S_2$) of multi-destination trees in TRILL network 11. A union of the first subset and the second subset may indicate at least one inactive multi-destination tree in the TRILL network:

$$S_1 \cup S_2 = A \backslash B, B \neq \Phi$$

where A is a set comprising substantially all multi-destination trees in network 11 and B is another set comprising substantially all inactive multi-destination trees in network 11, where B is not a null set $\Phi$. In other words, the union of $S_1$ and $S_2$ comprise substantially all active multi-destination trees in network 11. Each tree compute module 18(1)-18(N) may delete the inactive tree from a hash table of active trees (e.g., in the LSP database).

In various embodiments, tree pruning module 16 at spine switch 12(1), which acts as the true broadcast root, may receive a LSP indicating a change from an active status to an inactive status of the at least one multi-destination tree. Tree pruning module 16 may broadcast the first TLV and the second TLV to substantially all nodes in TRILL network 11. Tree pruning module 16 may broadcast the first TLV and the second TLV substantially each time a change in the multi-destination trees is detected.

According to various embodiments, route computation may be temporarily deferred until a predetermined threshold limit of number of active multi-destination trees in network 11 is reached. If a number of active multi-destination trees is below the predetermined threshold limit, tree pruning module 16 may re-compute the multi-destination trees for TRILL network 11 and broadcast a recomputed tree TLV. Upon receiving the recomputed trees TLV, each tree compute module 18(1)-18(N) may delete contents of the hash table and may repopulate the hash table with information from the recomputed trees TLV.

According to various embodiments, nodes at an edge of network 11, such as leaf switches 14(1)-14(N) can use the Trees Used Identifiers Sub-TLV to maintain the subset of active trees. When an LSP is received that impacts a particular tree, instead of computing the change in the tree right away, nodes at the edge of network 11 may defer the computation by taking the tree out of the active set. Edge nodes such as leaf switches 14(1)-14(N) can defer the computation by indicating different starting-tree number to indicate disjoint ranges of trees remaining active after pruning out the inactive trees.

TRILL protocol allows multiple instances of the Trees Used-Identifiers sub-TLV to be published so long as the sub-ranges are non-overlapping and not in conflict (e.g., with regard to root identification) for any given tree. The true broadcast root (e.g., spine switch 12(1)) may not reflect the collated information it receives from edge nodes in the Tree Identifiers Sub-TLV, as nodes in the interior of network 11 need not prune their trees, instead, retaining all trees in their original set as active.

In embodiments where the true broadcast root is an edge node, for example, leaf switch 14(1), tree pruning module 16 may be located at leaf switch 14(1). In such embodiments, leaf switch 14(1), as the true broadcast root, may prune trees from Trees Used Identifiers TLV, but not from Tree Identifiers TLV as the active set of trees in the interior of the network may not be changed. Embodiments of communication system 10 may provide benefit where a large number of trees are active in network 11, for example, because it trades off network churn against time by simply deferring computation on affected trees at the edge, and reducing the number of active trees.

However, by reducing the number of trees active in the network (at the edge and hence operationally at the interior), the granularity of load balancing can be affected. When an LSP is received, edge nodes such as leaf switches 14(1)-14(N) may examine if the network churn specified by the LSP affects trees in the currently active set in use locally on that node. In some embodiments, given an LSP, edge nodes may identify the trees impacted by the change carried in that LSP using Deep Packet Inspection techniques (DPI). Tree recomputation may be deferred until a lower bound—a predetermined threshold limit—on the number of active trees is reached. If the threshold limit is reached, it is recommended that the edge nodes discard all currently saved DPI data and state, and perform a fresh computation over all active trees (as specified by the true-root's Tree Identifier's TLV). In some embodiments, in a steady state operation of network 11, the threshold limit may not be hit frequently, providing smooth convergence for traffic in the face of network churn for long periods of time.

As an example, consider network 11 includes around 16 trees, with a predetermined threshold limit of four active trees. Each time there is a network churn, leaf switches 14(1)-14(N) may prune off affected trees. When the number of trees reaches 4, substantially all nodes in network 11 may start afresh to compute all 16 trees again and program routes afresh for all 16 trees. In some embodiments, the drop from 16 active trees to four active trees may happen over a relatively long period of time, which can allow absorption of multiple network churn events without affecting convergence for traffic.

In various embodiments, programming the hash table of active trees (where each tree is associated with an identifier called FTag) can be relatively faster than computing routes for affected trees and downloading and programming them into hardware (e.g., in read-only memory of leaf switches 14(1)-14(N)). Embodiments of communication system 10 can facilitate leaf switches 14(1)-14(N) to react to quickly a tree is affected, and by pruning it off the hash table of active trees, ingressing traffic may be quickly moved to trees that have no route-changes, thereby providing improved convergence and relatively loss-less absorption of churn.

Since each leaf switch 14(1)-14(N) makes a local determination of active trees, there may be no need for all nodes to inspect a capability bit or capability vector from every other node. Moreover, for trees that undergo a root-change, if there are trees with un-changed roots, they can be retained in the locally determined set of active trees. For trees that were deleted from the active set, it may be possible to combine them with some other trigger parameter and bring them back into the active set outside of a regular (e.g., normal, usual) SPF cycle and before the threshold limit is reached.

Embodiments of communication system can facilitate re-programming the hash table of active trees, which can be a relatively faster operation compared to computing and downloading routes into the hardware for each of the affected trees. In addition, because nodes in the interior of network 11 may not prune trees from the active set, any traffic that is already in flight in the interior may also be preserved, and may be able to reach its destination, further protecting against loss of traffic.

Turning to the infrastructure of communication system 10, the network topology can include any number of servers, load-balancers, switches (including distributed virtual switches), routers, and other nodes inter-connected to form a large and complex network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The network topology illustrated in FIG. 1 is simplified for ease of illustration, and may include any suitable topology, including tree, ring, star, bus, etc. in various embodiments. For example, the network may comprise Transparent Interconnection of Lots of Links (TRILL) network, access/edge/core network, etc. The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In some embodiments, tree pruning module 16 and tree compute modules 18(1)-18(N) can include appropriate software applications executing in one or more switches in network 11. In other embodiments, tree pruning module 16 and tree compute modules 18(1)-18(N) can include dedicated hardware service appliances dedicated to performing the operations described herein and connected to one or more switches as appropriate in network 11. In yet other embodiments, tree pruning module 16 and tree compute modules 18(1)-18(N) can include a suitable combination of hardware and software modules executing in appropriate network elements in network 11. Moreover, the network elements in network 11 may include any suitable hardware, software, components, modules, interfaces, or objects that facilitate the operations thereof. This may be inclusive of appropriate algorithms and communication protocols that allow for the effective exchange of data or information.

Merely for example purposes, and not as a limitation, assume that spine switch 12(2) fails and any tree rooted thereon is to be removed from the set of active trees. Tree pruning module 16 at spine switch 12(1), which acts as the true broadcast root, may generate a first TLV comprising a starting tree number of 1 and RBridge nickname of S1. No other nicknames may be presented therein. The subset of active trees in the first TLV thus includes only tree 1 rooted at RBridge S1. Tree pruning module 16 at spine switch 12(1), may generate a second TLV comprising a starting tree number of 3 and RBridge nicknames listed from S3 to S(m). The subset of active trees in the second TLV thus includes trees 3-m, rooted respectively at RBridges S3, . . . S(m). The union of the two subsets may indicate that tree 2, rooted at RBridge S2 is an inactive tree, as it is missing from both the first TLV and second TLV. Tree compute modules 18(1)-18(N) may receive the first TLV and second TLV and update their respective table of active trees by including only those trees that are listed in the combination of the first TLV and second TLV. Thus, the table of active trees may not include failed RBridge S2, namely spine switch 12(2).

Although tree pruning module 16 is illustrated as associated with spine switch 12(1), tree pruning module 16 may be associated with any suitable switch within network 11, including any of other spine switches 12(2)-12(m) and leaf switches 14(1)-14(n) that are not inactive in network 11. In a general sense, tree pruning module 16 may be associated with the true broadcast root (whether one of spine switches 12(1)-12(m) or leaf switches 14(1)-14(n)) in network 11. In an alternate embodiment, tree pruning module 16 may execute in substantially all leaf switches 14(1)-14(n) in network 11. Each tree pruning module 16 may identify inactive trees in network 11 and modify the hash table of active trees in the associated leaf switch 14(1)-14(n). In addition, the list of active trees may be broadcast in respective Tree Used Identifiers TLVs as appropriate.

Figure 2:
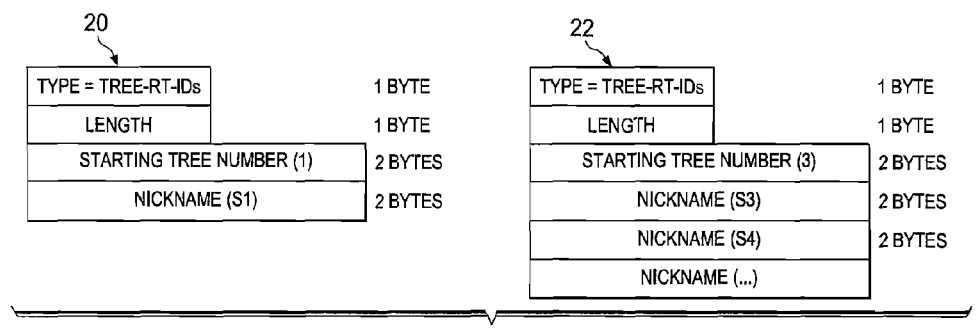
FIG. 2 is a simplified block diagram illustrating example details of the communication system in accordance with one embodiment.

Turning to FIG. 2, FIG. 2 is a simplified block diagram illustrating example details of TLVs generated by tree pruning module 16 according to an embodiment of communication system 10. Example TLVs 20 and 22 may comprise TREE-RT-ID type TLVs. Example TLV 20 may be the first TLV generated by tree pruning module 16 when an affected tree, say spine switch 12(2), identified as RBridge S2, is sensed (e.g., as failed or inactive) in network 11. First TLV 20 may indicate a starting tree number of 1 and RBridge nickname of S1. Example TLV 22 may be the second TLV generated by tree pruning module 16. Second TLV 22 may include a starting tree number of 3 and RBridge nicknames listed from S3 to S(m). The combination of first TLV 20 and second TLV 22 may indicate that RBridge S2 is inactive in network 11.

Figure 3:
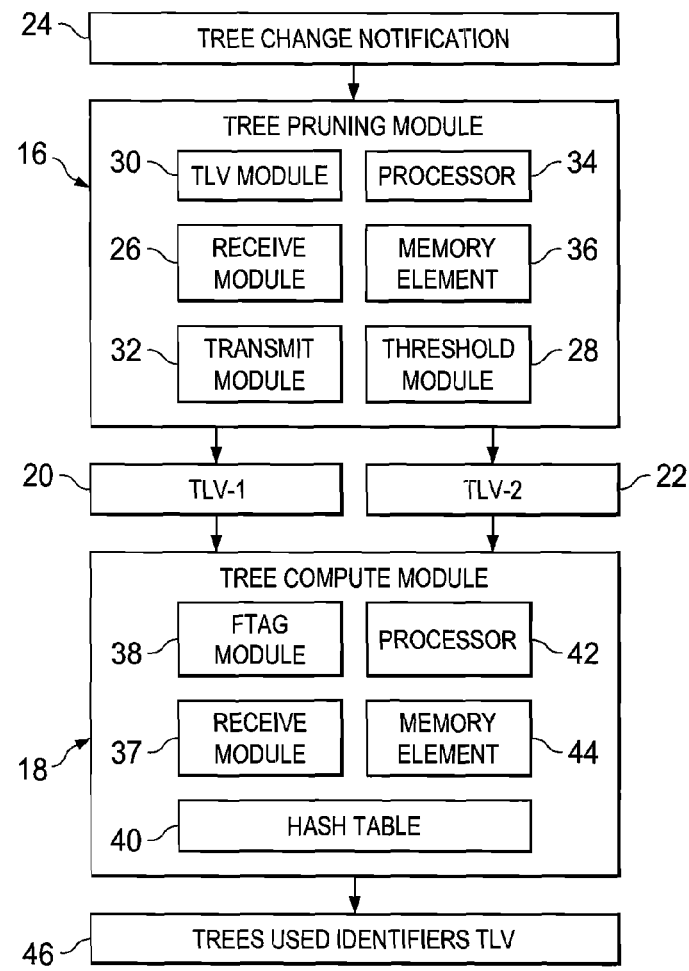
FIG. 3 is a simplified block diagram illustrating other example details of the communication system in accordance with one embodiment.

Turning to FIG. 3, FIG. 3 is a simplified block diagram illustrating example details of example tree pruning module 16 and example tree compute module 18 according to an embodiment of communication system 10. Example tree pruning module 16 may receive a tree change notification 24. Tree change notification 24 can include any suitable mechanism, including LSP, for indicating a change in any tree in network 11. A receive module 26 may receive tree change notification 24. A threshold module 28 may compare the number of active trees with a predetermined threshold limit. If the threshold limit is not reached, TLV module 30 may generate first TLV 20 (TLV-1) and second TLV 22 (TLV-2) listing appropriate subsets of active trees. A transmit module 32 may broadcast first TLV 20 and second TLV 22 in network 11. A processor 34 and a memory element 36 may facilitate operations described herein.

Example tree compute module 18 may include receive module 27 that receives first TLV 20 and second TLV 22. A forwarding tag (FTAG) module 38 may compare the RBridge nicknames in first TLV 20 and second TLV 22 with a list of active trees in a hash table 40. Any discrepancy may be addressed by deleting missing trees indicated by (e.g., missing from) the combination of first TLV 20 and second TLV 22 from hash table 40. A processor 42 and a memory element 44 may facilitate operations described herein. Tree compute module 18 may broadcast its list of active trees in a Trees Used Identifiers (TREE-USE-IDs) TLV 46 as appropriate.

In some example embodiments, one or more memory elements (e.g., memory elements 36, 44) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processors 34, 42) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Figure 4:
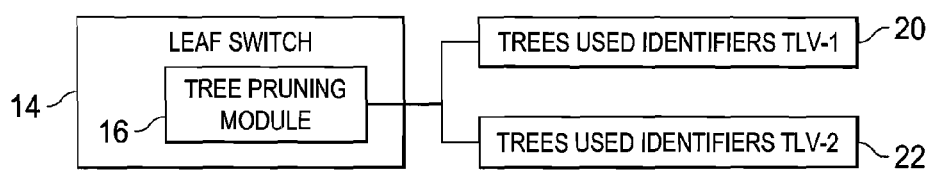
FIG. 4 is a simplified block diagram illustrating yet other example details of the communication system in accordance with one embodiment.

Turning to FIG. 4, FIG. 4 is a simplified block diagram illustrating an example embodiment of communication system 10. Tree pruning module 16 may execute in an example leaf switch 14. In the example embodiment illustrated, first TLV 20 and second TLV 22 may comprise TREE-USE-IDs sub TLVs rather than TREE-RT-IDs.

Figure 5:
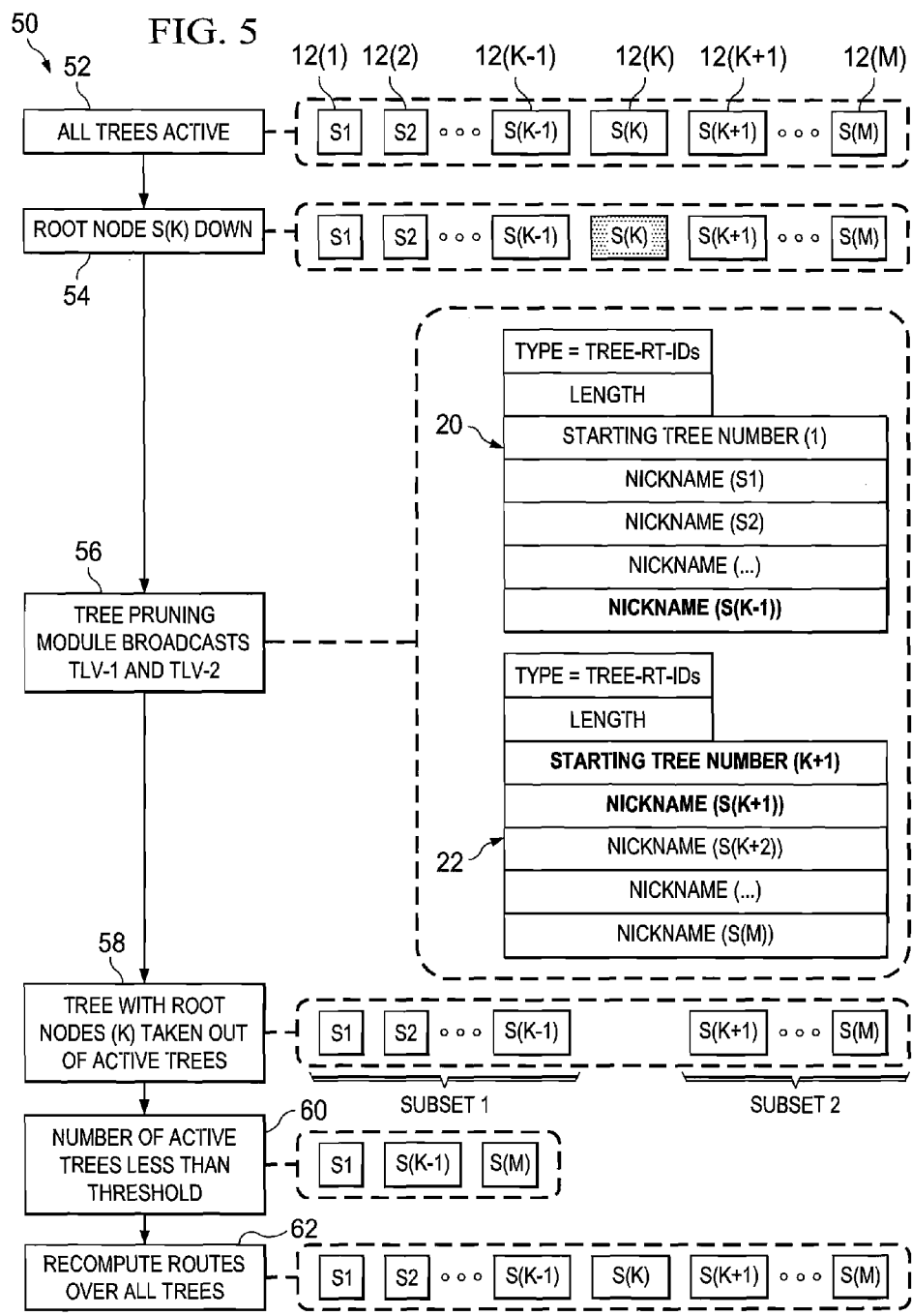
FIG. 5 is a simplified flow diagram illustrating potential example operations and example details that may be associated with an embodiment of the communication system.

Turning to FIG. 5, FIG. 5 is a simplified flow diagram illustrating example operations 50 that may be associated with embodiments of communication system 10. At 52, substantially all trees in network 11 may be active. For example, the roots of trees, indicated by spine switches 12(1)-12(M) (e.g., S1, S2, . . . S(M)) may all be active, indicating that the corresponding trees are also active. At 54, spine switch 12(K), representing root node S(K) may become inactive (e.g., power down, faulty, removed from network, etc.). At 56, tree pruning module 16 may broadcast first TLV 20 (e.g., TLV-1) and second TLV 22 (e.g., TLV-2). First TLV 20 may include trees starting from 1, with a list of RBridges from S1 to S(K−1). Second TLV 22 may include trees starting from (K+1), with a list of RBridges from S(K+1) to S(M). Spine switch represented by root node S(K) may not be present in the list of RBridges in the combination of first TLV 20 and second TLV 22.

At 58, the tree with root node S(K) at spine switch 12(K) may be taken out of the set of active trees at each leaf switch 14(1)-14(N). Spine switches 12(1)-12(K−1) listed in first TLV 20 may be included in subset 1; spine switches 12(K+1)-12(M) listed in second TLV 22 may be included in subset 2. The operations may continue thus, with any further inactive trees being taken out of the set of active trees. At 60, the number of active trees may fall below a threshold limit, say 4: assume that only spine switches 12(1), 12(K−1) and 12(M) may be active. At 62, each leaf switch 14(1)-14(m) may recompute routes over substantially all the trees in network 11, resulting in active trees being rooted at spine switches 12(1)-12(m). Subsequently, the operations may continue as described herein.

Figure 6:
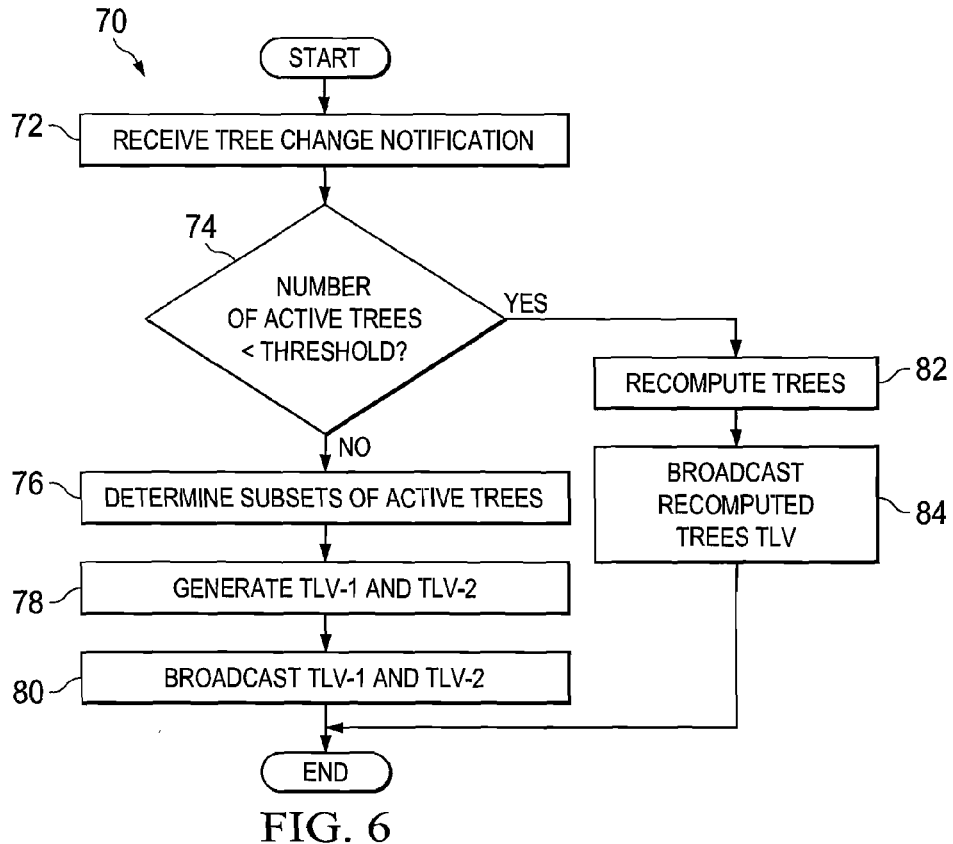
FIG. 6 is a simplified flow diagram illustrating other example operations that may be associated with an embodiment of the communication system.

Turning to FIG. 6, FIG. 6 is a simplified flow diagram illustrating example operations 70 that may be associated with embodiments of communication system 10. At 72, tree pruning module 16 may receive tree change notification 24. At 74, a determination may be made whether the number of active trees in network 11 is less than a predetermined threshold limit. If the number of active trees is not less than the threshold limit, at 76, tree pruning module 16 may determine the subsets of active trees, namely the trees in network 11 not including any inactive trees. At 78, tree pruning module 16 may generate first TLV 20 and second TLV 22. At 80, tree pruning module 16 may broadcast first TLV 20 and second TLV 22. Turning back to 74, if the number of active trees is less than the threshold limit, at 82, tree pruning module 16 may recompute the trees based on substantially all available nodes in network 11. At 84, tree compute module 16 may broadcast a recomputed trees TLV, including a list of substantially all root nodes in network 11.

Figure 7:
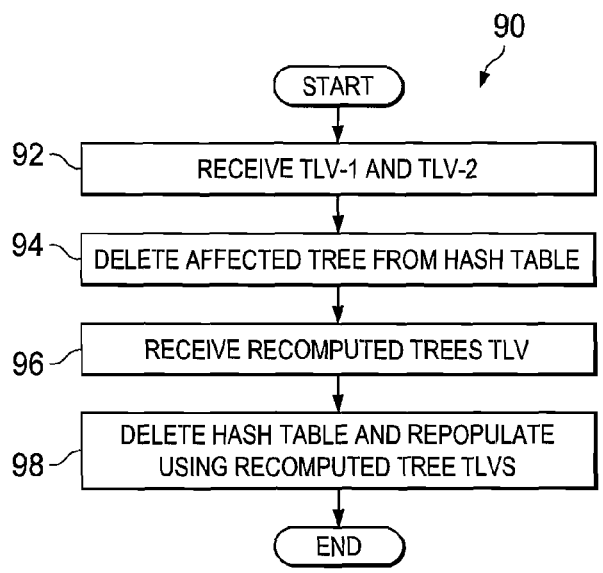
FIG. 7 is a simplified flow diagram illustrating yet other example operations that may be associated with an embodiment of the communication system.

Turning to FIG. 7, FIG. 7 is a simplified flow diagram illustrating example operations 90 that may be associated with embodiments of communication system 10. At 92, tree compute module 18 may receive first TLV 20 and second TLV 22. At 94, the affected tree(s) that is(are) missing in the combination of first TLV 20 and second TLV 22 may be deleted from hash table 40 comprising the set of active trees in network 11 handled by the respective leaf switch (e.g., leaf switch 14(1)). At 96, tree compute module 18 may receive a recomputed trees TLV. At 98, tree compute module 18 may delete hash table 40 (or the contents thereof), and repopulate (or regenerate) hash table 40 using the recomputed trees TLV.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, tree pruning module 16 and tree compute module 18. In some embodiments, one or more of these features may be implemented in hardware, provided external to these elements, or consolidated in any appropriate manner to achieve the intended functionality. The various network elements (e.g., servers, switches) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, tree pruning module 16 and tree compute module 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a leaf switch in a Transparent Interconnection of Lots of Links (TRILL) network, a first type-length-value (TLV) message from a true broadcast root in the TRILL network indicating a first subset of multi-destination trees in the TRILL network;
   receiving, at the leaf switch, a second TLV message from the true broadcast root indicating a second subset of multi-destination trees in the TRILL network, wherein a union of the first subset and the second subset indicates at least one inactive multi-destination tree in the TRILL network; and
   deleting, by the leaf switch using a processor, the indicated inactive multi-destination tree from a hash table of active multi-destination trees stored in a memory element of the leaf switch, wherein the true broadcast root receives a link-state packet (LSP) indicating a change from an active status to an inactive status of the indicated multi-destination tree to be deleted from the hash table, and broadcasts the first TLV and the second TLV to the TRILL network.

2. The method of claim 1, wherein the true broadcast root broadcasts the first TLV and the second TLV substantially each time a change in the multi-destination trees is detected.

3. The method of claim 1, wherein if a number of active multi-destination trees is below a threshold limit, the true broadcast root re-computes multi-destination trees for the TRILL network and broadcasts a recomputed trees TLV.

4. The method of claim 3, further comprising:
   receiving the recomputed trees TLV;
   deleting contents of the hash table; and
   repopulating the hash table with information from the recomputed trees TLV.

5. The method of claim 1, wherein the true broadcast root comprises a spine node in the TRILL network, wherein the first TLV and the second TLV each comprises a Tree Identifiers TLV.

6. The method of claim 1, wherein the true broadcast root comprises a leaf node in the TRILL network, wherein the true broadcast root prunes the at least one multi-destination tree from a Trees Used Identifier TLV, but not from a Tree Identifiers TLV.

7. The method of claim 1, wherein route computation is temporarily deferred until a predetermined threshold limit of number of active multi-destination trees is reached.

8. A non-transitory tangible media encoding logic that includes instructions for execution, which when executed by a processor, is operable to perform operations comprising:
   receiving, at a leaf switch in a Transparent Interconnection of Lots of Links (TRILL) network, a first type-length-value (TLV) message from a true broadcast root in the TRILL network indicating a first subset of multi-destination trees in the TRILL network;
   receiving, at the leaf switch, a second TLV message from the true broadcast root indicating a second subset of multi-destination trees in the TRILL network, wherein a union of the first subset and the second subset indicates at least one inactive multi-destination tree in the TRILL network; and
   deleting, by the leaf switch, the indicated inactive multi-destination tree from a hash table of active multi-destination trees stored in a memory element of the leaf switch, wherein the true broadcast root receives a link-state packet (LSP) indicating a change from an active status to an inactive status of the indicated multi-destination tree to be deleted from the hash table, and broadcasts the first TLV and the second TLV to the TRILL network.

9. The media of claim 8, wherein the true broadcast root broadcasts the first TLV and the second TLV substantially each time a change in the multi-destination trees is detected.

10. The media of claim 8, wherein if a number of active multi-destination trees is below a threshold limit, the true broadcast root re-computes multi-destination trees for the TRILL network and broadcasts a recomputed trees TLV.

11. The media of claim 10, the operations further comprising:
    receiving the recomputed trees TLV;
    deleting contents of the hash table; and
    repopulating the hash table with information from the recomputed trees TLV.

12. The media of claim 8, wherein the true broadcast root comprises a spine node in the TRILL network, wherein the first TLV and the second TLV each comprises a Tree Identifiers TLV.

13. An apparatus in a Transparent Interconnection of Lots of Links (TRILL) network, comprising:
    a tree compute module;
    a memory element for storing data; and
    a processor that executes instructions associated with the data, wherein the processor and the memory element cooperate such that the apparatus is configured for:
      receiving, at the apparatus, a first type-length-value (TLV) message from a true broadcast root in the TRILL network indicating a first subset of multi-destination trees in the TRILL network;
      receiving, at the apparatus, a second TLV message from the true broadcast root indicating a second subset of multi-destination trees in the TRILL network, wherein a union of the first subset and the second subset indicates at least one inactive multi-destination tree in the TRILL network; and
      deleting, by the apparatus, the indicated inactive multi-destination tree from a hash table of active multi-destination trees stored in a memory element of the leaf switch, wherein the true broadcast root receives a link-state packet (LSP) indicating a change from an active status to an inactive status of the indicated multi-destination tree to be deleted from the hash table, and broadcasts the first TLV and the second TLV to the TRILL network.

14. The apparatus of claim 13, wherein the true broadcast root broadcasts the first TLV and the second TLV substantially each time a change in the multi-destination trees is detected.

15. The apparatus of claim 13, wherein if a number of active multi-destination trees is below a threshold limit, the true broadcast root re-computes multi-destination trees for the TRILL network and broadcasts a recomputed trees TLV.

16. The apparatus of claim 15, further configured for:
 receiving the recomputed trees TLV;
 deleting contents of the hash table; and
 repopulating the hash table with information from the recomputed trees TLV.

17. The apparatus of claim 13, wherein the true broadcast root comprises a spine node in the TRILL network, wherein the first TLV and the second TLV each comprises a Tree Identifiers TLV.

* * * * *